United States Patent [19]

Schauss

[11] Patent Number: 4,923,184

[45] Date of Patent: May 8, 1990

[54] CLAMPING DEVICE

[75] Inventor: Peter Schauss, Flörsheim, Fed. Rep. of Germany

[73] Assignee: DE-STA-CO Metallerzeugnisse GmbH, Frankfurt am Main, Fed. Rep. of Germany

[21] Appl. No.: 262,533

[22] Filed: Oct. 25, 1988

[30] Foreign Application Priority Data

Oct. 29, 1987 [DE] Fed. Rep. of Germany ... 8714390[U]
Apr. 15, 1988 [DE] Fed. Rep. of Germany ... 8804990[U]

[51] Int. Cl.[5] .......... B23Q 3/03
[52] U.S. Cl. .......... 269/32
[58] Field of Search .......... 92/177; 269/32, 24, 269/25, 20, 27; 254/108, 105

[56] References Cited

U.S. PATENT DOCUMENTS

| | | | |
|---|---|---|---|
| 1,658,962 | 2/1928 | Aikens | 92/177 |
| 3,454,971 | 7/1969 | Wolf | 269/32 |
| 4,183,502 | 1/1980 | Skaalen | 254/108 |
| 4,723,767 | 2/1988 | McPherson et al. | 269/32 |

*Primary Examiner*—Robert C. Watson

*Attorney, Agent, or Firm*—Kurt Kelman

[57] ABSTRACT

A clamping device, more particularly a toggle lever clamping device is devised for clamping workpieces and comprises an actuator cylinder (3) with a mounting head (23), said mounting head protruding from the piston rod and being provided with the control mechanism for the clamping arm (24) which is linked to said mounting head and, furthermore, two pressure medium supply lines and sensors for the final position with connecting lines. A positioning rod (5), provided with positioning elements (4), is arranged on the free end (1) of, and parallel to, the piston rod (2) and directed toward the actuator cylinder (3). The positioning path (W) of the positioning elements (4) extends within the region of the actuator cylinder (3). At least two sensors (6, 6') for the end position are located in the region of the positioning path (W). Both pressure medium inlet terminals (7, 8) are mounted on the free end (9) of the actuator cylinder (3) and the outlet lines (10) of the sensors (6) are also mounted in axial direction to the longitudinal axis (11) of the actuator cylinder (3) and on the free end (9) of the said cylinder (3).

16 Claims, 2 Drawing Sheets

Fig. 3
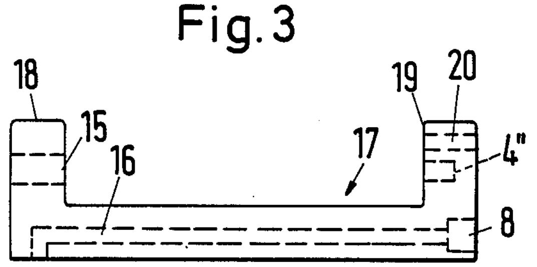
Fig. 4
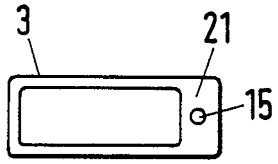
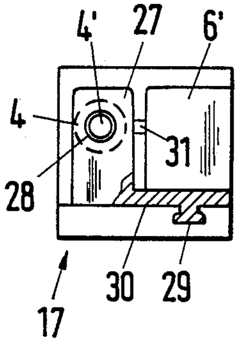
Fig. 5
Fig. 6
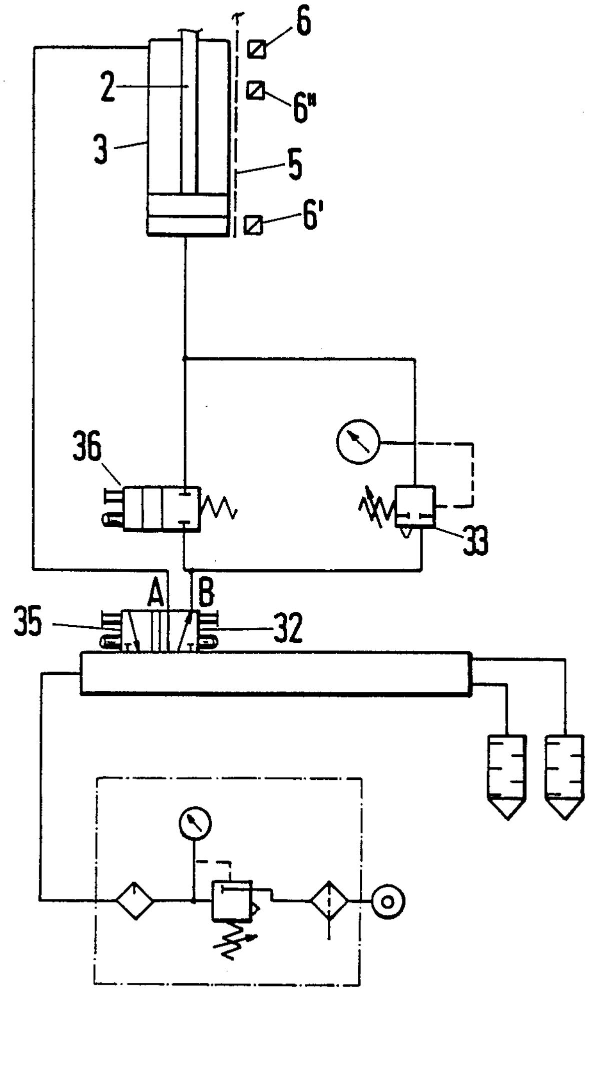

CLAMPING DEVICE

The invention relates to a clamping device, more particularly to a toggle lever clamping device, for holding workpieces.

BACKGROUND OF THE INVENTION

Clamping devices of this type are sufficiently known and in use, so that there is no need for any particular printed documentation therefor. Such clamping devices are needed to clamp workpieces for working on them on tables of working machines, more particularly to clamp car body parts or like sheet metal in position to weld them together. The operation of the clamping arms on these devices is usually performed with actuator cylinders. The actuator cylinders operate by pneumatic pressure acting on one side or the other in order to bring the clamping arm, on the one hand, into a closing position and, on the other hand, into an opening position. The pressure medium terminals are mounted laterally of the flanges which form the ends of the cylinder, i.e., the pressure medium reset-line in particular extends laterally along the entire length of the adjusting cylinder. Depending on the type of sensors used (a magnetic field switch or a proximity switch), for the determination of the end position the same is applicable, i.e., these sensors are placed either on the mounting head of the device or laterally in the region of the actuator cylinder, the guide for the line also extending laterally of the device. Mechanically functioning roller feeler switches, operating uninfluenceds by electromagnetic influences from the outside, can practically not be used in such devices because there is usually too little space available in the region of the mounting head. The lateral feed of the pressure medium lines to the respective ends of the actuator cylinder and the cable line to the sensors, which is also positioned at one side of the device, are regarded as a particular disadvantage of such devices. On the one hand, it has to be taken into account that there is very often extremely limited space for the installation of such devices so that the outside guidance of the lines can be hindering. Furthermore, such lateral line guidances are naturally exposed to outside impairments and damages.

OBJECTS OF THE INVENTION

An object of the present invention is to improve clamping devices of the indicated type so that outside and laterally positioned line guidances can be eliminated whereby the possibility will be provided, if necessary, to use also mechanically functioning roller feeler switches in the region of the actuator cylinder, i.e., to position said switches on the far side of the mounting head of the device.

SUMMARY OF THE INVENTION

This problem can be solved, in the practice of the invention, with a clamping device comprised of an actuator cylinder with a mounting head protruding from the piston rod and being provided with a control mechanism for the clamping arm linked to the mounting head. Furthermore, the clamping device comprises two pressure medium supply lines and sensors for the detection of the final position with connecting lines, a positioning rod, provided on its free end with positioning elements, arranged on the free end of the piston rod, parallel to said rod and pointing in the direction of the actuator cylinder, the positioning path of the positioning elements of the positioning rod being arranged in the region of the actuator cylinder and at least two sensors for the detection of the end position being arranged in the region of the positioning path and both pressure medium terminals being mounted on the free end of the actuator cylinder, the outlet lines of the sensors which detect the final position also being arranged parallel to the cylinder axis on the free end of the actuator cylinder.

By means of this embodiment of the invention, all pressure medium supply lines and also the cables that lead to the sensors or limit switches can be connected on the far side of the actuator cylinder remote from the mounting head where said lines and cables can be led away axially with respect to the actuator cylinder. Therewith, very clear and distinctly visible installation conditions are given for such type of clamping devices and the entire "wire and cable mess" at the side of the device is eliminated. On the one hand, it is essential, that the terminal for the pressure medium reset-line is placed on the far side of the actuator cylinder remote from the mounting head, which is done by providing a line integrated, in a suitable manner to be explained hereinafter, into the device in the interior of the cylinder with an outlet near the mounting head.

For the detection of the end position, it is essential that it will not take place on the piston rod or on the piston, but on a positioning rod provided particularly therefor, which extends parallel to the piston rod and is fastened to the end of said piston rod remote from the cylinder. Said positioning rod is provided, on its free end, with positioning elements whose positioning path, therefore, extends adjacent the actuator cylinder. By repositioning the pressure medium terminals to the far side of the cylinder remote from the mounting head and repositioning the sensors in the region adjacent the actuator cylinder, on the one hand, the lengths of the lines become shorter and, on the other hand, all lines and cables lead, advantageously and as aforementioned, axially to the rear from the actuator cylinder. Since these lines and cables leave freely and without support from the rear of the actuator cylinder, no damage can occur to these lines and cables, which can occur, however, in devices where they extend along the side of the entire device since the device itself then forms a support against which the lines and cables may be damaged.

Of particular interest is the embodiment of clamping devices according to the invention, wherein the actuator cylinder has a piston which is oval, elliptical, slot-shaped or flat-rectangular in cross-section, i.e., such devices which, in consideration of narrow installation conditions, are very slender in their construction.

In regard to the practical realization of the clamping device according to the invention, said device can be built so that the end flanges of the actuator cylinder are elongated toward the side of the positioning rod and the flange on the side of the piston rod is provided with a through passage for the positioning rod. The pressure medium reset-line is arranged between the two flanges and the pressure medium terminals are mounted axially on the flange which is positioned on the far side of the piston rod.

Furthermore, also such embodiment is possible wherein a U-shaped shoulder piece is arranged on the cylinder at the side of the positioning rod, the positioning path of the positioning element extending between the shoulders of the U-shaped shoulder piece and the pressure medium reset-line extending along the shoulder piece base. the shoulder on the side of the piston rod is provided with a through passage for the positioning rod and the shoulder on the far side of the piston rod is provided with the terminal for the pressure medium reset-line and with a through passage for the sensor line.

Another possible alternative is to arrange the pressure medium reset-line in a thicker portion of the cylinder wall and to fasten the positioning rod to an angle piece which is fixed on the free end of the piston rod and from which the positioning rod extends parallel to the piston rod in such manner that the positioning element on the free end moves in the region adjacent the actuator cylinder. The sensors are arranged there at a distance from each other that corresponds to the distance of the end positions of the piston. The sensors, more particularly mechanically functioning roller feeler switches, can then likewise be placed in the said region without any problem. The cables of the said sensors are led in the shortest way to the far side of the actuator cylinder remote from the mounting head.

Other objects, advantages and novel features of the invention will become apparent from the following detailed description of the invention when considered in conjunction with the accompanying drawings wherein:

BRIEF DESCRIPTION OF THE DRAWINGS

The device according to the invention will be described herein-below in greater detail in a presently preferred embodiment shown in the drawing, in which: in the schematic drawing.

FIG. 3 is a side-view of a particular embodiment of a part of the device;

FIG. 4 is a cross-sectional view of the cylinder in a particular embodiment;

FIG. 5 is a structural detail of the device and

FIG. 6 is the pneumatic circuit diagram of the device in a particular embodiment.

DESCRIPTION OF THE DRAWINGS

The illustrated embodiment is a slender structure wherein the actuator cylinder and the piston are e.g. slot-shaped in cross-section.

Figure 1:
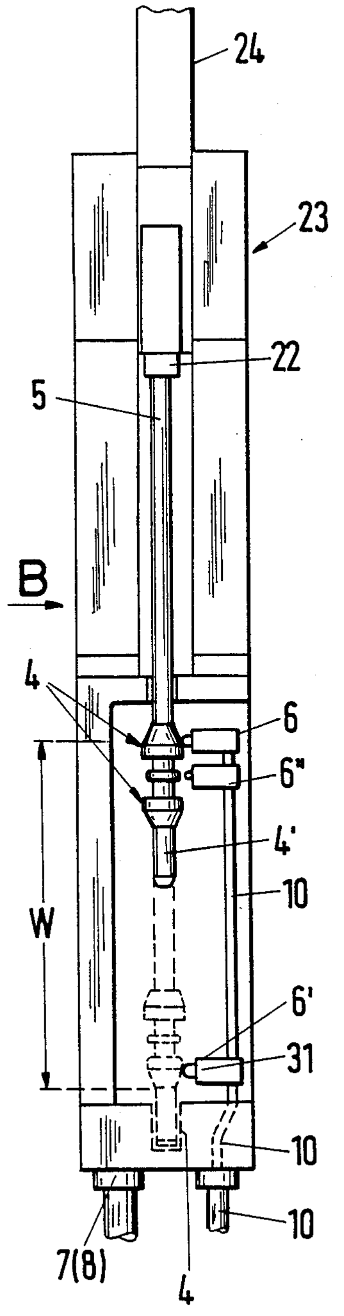
FIG. 1 is a view of the clamping device looking in the direction of arrow A.
Figure 2:
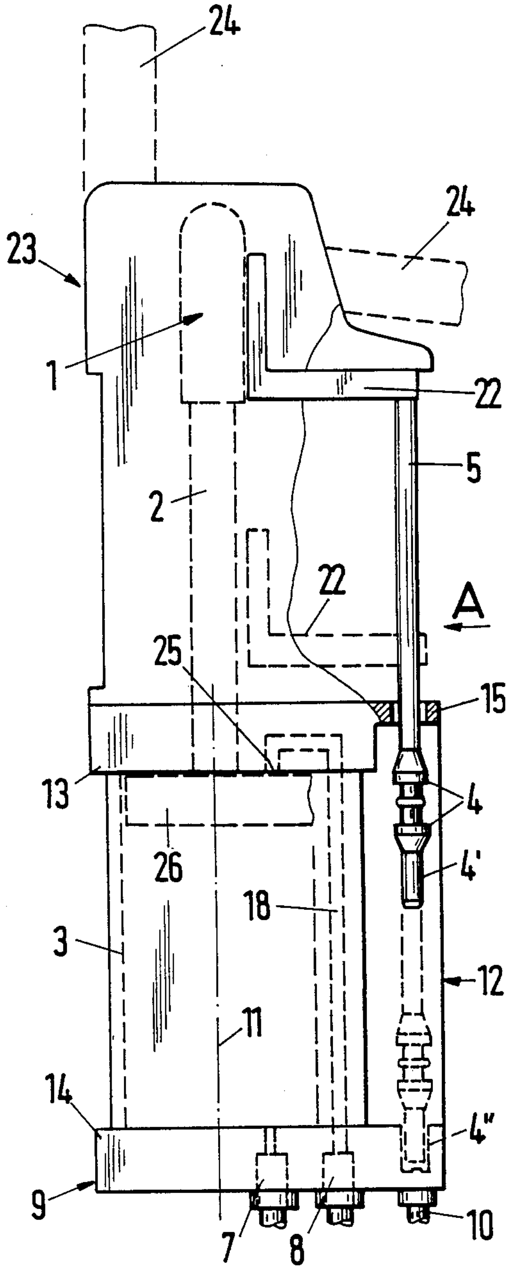
FIG. 2 is partially a sectional and side view of the clamping device according to FIG. 1 looking in the direction of arrow B.

Referring to FIGS. 1 and 2, the clamping device comprises an actuator cylinder 3 with a mounting head 23 protruding from the piston rod. The control mechanism for the clamping arm 24 linked to the mounting head is arranged on and in the mounting head 23. Said control mechanism and the attachment of clamping arm 24 are known elements and need therefore not to be described herein.

Referring to FIG. 2, the device is so constructed that positioning rod 5, provided on its free end with positioning elements 4, is arranged on free end 1 of, and parallel to, piston rod 2 and is directed toward the actuator cylinder 3. The positioning path W of the positioning elements 4 on rod 5 extends in the region of the actuator cylinder 3, i.e., parallel to its longitudinal axis 11. Sensors 6, which detect the end positions, are arranged at the ends of the positioning path W. Preferably and advantageously, mechanically functioning roller feeler switches are used for said sensors. As is shown at the bottom of FIGS. 1 and 2, the pressure medium inlet terminals 7 and 8 are mounted at the end of the actuator cylinder remote from the mounting head so that the pressure medium lines can be led away axially from end 9 of the actuator cylinder 3. The outlet lines 10 for the limit sensors 6 lead likewise away from the free end 9 of the actuator cylinder 3 and in the direction of the longitudinal axis 11 of the said actuator cylinder.

In the very slender embodiment of the invention presented in FIG. 1, the positioning rod 5 with its associated sensors 6, 6' and the pressure medium reset-terminal are arranged on the narrow side 12 of the device.

In order to be able to reposition the pressure medium reset-terminal 8 to end 9 of the actuator cylinder 3, it is necessary to provide that the pressure medium will reach the interior of the cylinder from terminal 8 through outlet 25 to achieve thereby the retraction of piston 26 and piston rod 2. In the illustrated embodiment, both connecting flanges 13, 14 of the actuator cylinder 3 are extended towards the positioning rod, flange 13 being provided with a through passage 15 for the positioning rod. A pressure medium reset-line 16, which connects the terminal 8 on flange 14 with the outlet 25, is placed sealed between flanges 13, 14.

According to FIG. 3, a U-shaped shoulder piece 17 is mounted on cylinder 3 laterally adjacent positioning rod 5 whereby the positioning path W of the positioning elements 4 extends between its shoulders 18, 19. As indicated by the broken line, the pressure medium reset-line 16 extends through base 19 of the shoulder piece which is connected, in a suitable manner, to the actuator cylinder 3 or to the flanges thereof. Shoulder 18 is provided with through passage 15 for the positioning rod and the other shoulder 19 is provided with a through passage 20 for the sensor lines.

Referring now to FIG. 4, it is also possible to place the pressure medium reset-line 16 in a thicker portion 21 of the wall of cylinder 3, the flanges of the cylinder then being adapted to the entire cross-section of such a cylinder. The line guidance, as is shown in FIG. 2, remains in principle unchanged.

In all these embodiments of the invention, there is so to speak a niche created laterally next to the actuator cylinder 3 wherein the pressure medium reset-line 16 is placed protectively and whereinto the free end of rod 5, which is provided with positioning element 4, extends and in which region the sensors 6 are also arranged at a distance D from each other, which corresponds to the distance of the end positions of the piston. Advantageously but not particularly described herein, this niche can be provided, in a simple manner and without any problem, with a cover, even though this niche is already by itself a protection for the aforementioned elements. The cables and the pressure medium reset-terminal 8 lead axially away from said niche so that all supply lines to the device can be connected axially to the end of the actuator cylinder 3 remote from the mounting head. Pressure medium terminal 7 is likewise mounted axially on this end. For an exact guidance of the bottom position of positioning rod 5 in regard to the sensor 6' arranged thereat, which detects the retracted and opening position of clamping arm 24, it is advantageous to provide the free end of the positioning rod 5 with an extension 4'. A bore hole 4'' is provided either on flange 14 or on shoulder 19 of shoulder piece 17 in registry with, and for engagement by, extension 4'. The length of the extension and the depth of the bore hole (a blind hole or through passage) are so dimensioned that the free end of the extension 4' fits into the bore hole 4" when contact between the positioning element 4 and sensor 6 occurs.

In order to be variable in regard to the detection of the end position by the sensors 6, 6', it is furthermore advantageous to mount said sensors adjustably parallel to the positioning path W in or on the device. For this purpose and referring to FIG. 5, the actuator cylinder 3 or alternatively the U-shaped shoulder piece 17 is provided with a guide groove 29 in which the sensors 6, 6' can be displaced and fixed in the desired position. It is advantageous to guide particularly sensor 6' remote from the mounting head not directly in the groove 29 but to fasten said sensor or an intermediate piece 30, which is guided in said groove 29 and is provided with a protrusion 27 that extends into the positioning path W of the positioning rod 5. Protrusion 27 is provided in alignment with extension 4' with a guide bore 28 for the extension. For the arrangement of such protrusion 27 with the guide bore 28, an intermediate piece 30 of the illustrated type is not absolutely necessary, but it can also be mounted on sensor 6' in another suitable manner. Said protrusion 27 with its bore 28 takes part, in any case, in the adjustment of sensor 6' and guarantees thereby that extension 4' has, in each position of sensor 6', an exact guidance to the feeler 31 of sensor 6'. The described embodiment makes it possible that an additional sensor 6" is mounted near sensor 6 in the region of the positioning path W between sensors 6 and 6'. The distance between sensor 6 and sensor 6" is adjustable (see FIG. 1). Sensor 6' ∝ serves to move piston rod 2 extended under low pressure to sensor 6" which switches the pressure system from low to full pressure so as to exert a full clamping pressure on the workpiece by clamping arm 24. The position of the adjustable sensor 6" has to be so chosen that the switch from low to full pressure will occur only when the gap between clamping arm 24 and the workpiece is smaller than the thickness of one finger. This meets an essential safety requirement for such clamping devices in a simple manner.

Referring now to FIG. 6, the actuator cylinder 3 is in the original position retracted and stands on sensor 6'. Upon the start signal a predetermined pressure is built up through valve 32 and pressure control valve 33 and cylinder 3 is moved. As soon as sensor 6" is reached, valve 34 switches and the cylinder 3, respectively the clamping device, is closed under full pressure of the system. After cylinder 3 has reached sensor 6, the return stroke can be initiated. For that purpose, the valves 33 and 34 are switched to the original position. Valve 32 will be switched over to 35.

While present exemplary embodiments of this invention, and methods of practicing the same, have been illustrated and described, it will be recognized that this invention may be otherwise variously embodied and practiced within the scope of the following claims.

What I claim is:

1. A clamping device for clamping a workpiece, comprising (a) a mounting head, (b) a clamping arm linked to the mounting head for movement into and out of a clamping position, (c) an actuator for moving the clamping arm into and out of said positions, the actuator including (1) a cylinder carrying the mounting head and having a free end face remote from the mounting head, and (2) a piston rod reciprocable in the actuator cylinder along a longitudinal axis thereof and having a free end extending into the mounting head, (d) two pressure medium inlet terminals mounted on the free actuator cylinder end face and extending in the direction of the longitudinal axis for connection to two pressure medium supply lines, (e) a positioning rod affixed to the free piston rod end and reciprocable therewith, the positioning rod extending towards the actuator cylinder parallel to the piston rod and carrying (1) positioning elements reciprocable with the positioning rod in a positioning path extending along the actuator cylinder, the positioning path being defined between two end positions, and (f) two sensors arranged along the positioning path for detecting the end positions of the positioning path, the sensors having (1) outlet lines mounted on the free actuator cylinder end face and extending in the direction of the longitudinal axis.

2. The clamping device of claim 1, wherein the clamping arm is a toggle lever.

3. The clamping device of claim 1, wherein the actuator cylinder has a rectangular cross section of narrow width and has two short sides and two long sides, the clamping arm is linked to the mounting head at one short side of the rectangular cylinder and one of the pressure medium inlet terminals is positioned along the short cylinder side opposite the one short side.

4. The clamping device of claim 1, further comprising two connecting flanges on the actuator cylinder, one of the connecting flanges being at the free cylinder end face and the other connecting flange being at an opposite end face of the cylinder wherefrom the piston extends into the mounting head, the connecting flanges extending beyond the positioning rod, the other cylinder flange defining a through passage through which the positioning rod extends into a chamber defined by the cylinder and the connecting flanges, the positioning path extending in said chamber, the pressure medium inlet terminals being mounted in the one connecting flange and said one connecting flange defining a through passage for the outlet lines, and a pressure medium reset line arranged between the two connecting flanges and connected to one of the pressure medium inlet terminals.

5. The clamping device of claim 4, wherein the positioning rod has a free end extending beyond the positioning elements and the one connecting flange has a bore in alignment with the free positioning rod end for receiving said end in one of the end positions.

6. The clamping device of claim 1, further comprising a U-shaped piece having a base affixed to the actuator cylinder and two shoulders, one of the shoulder being at the free cylinder end face and the other shoulder being at an opposite end face of the cylinder wherefrom the piston extends into the mounting head, the shoulders extending beyond the positioning rod, the other shoulder defining a through passage through which the positioning rod extends into a chamber defined by the base and shoulders, the positioning path extending in said chambers, one of the pressure medium inlet terminals being mounted in the one shoulder and said one shoulder defining a through passage for the outlet lines, and a pressure medium reset line arranged in the base connected to the one pressure medium inlet terminal.

7. The clamping device of claim 6, wherein the positioning rod has a free end extending beyond the positioning elements and the one shoulder has a bore in alignment with the free positioning rod end for receiving said end in one of the end positions.

8. The clamping device of claim 1, wherein the actuator cylinder has a thickened wall portion extending between the free end face thereof and an end face opposite thereto wherefrom the piston rod extends into the mounting head, further comprising a pressure medium reset line connected to one of the pressure medium inlet terminals and extending through the thickened cylinder wall portion.

9. The clamping device of claim 1, further comprising an angle piece affixing the positioning rod to the free piston end.

10. The clamping device of claim 1, wherein the sensors are spaced from each other along the positioning path a distance corresponding to the end positions of the cylinder piston.

11. The clamping device of claim 1, wherein the sensors are roller feeler switches.

12. The clamping device of claim 1, wherein at least the sensor at one of the end positions closer to the mounting head than the opposite end position is mounted for adjustment along the positioning path.

13. The clamping device of claim 12, wherein the sensor at the opposite end position also is mounted for adjustment along the positioning path and has a protrusion extending into the positioning path, the positioning rod has a free end extending beyond the positioning elements and the protrusion has a bore in alignment with the free positioning rod end for receiving said end in one of the end positions.

14. The clamping device of claim 13, further comprising a guide groove extending along a side of the actuator cylinder facing the positioning path, the guide groove extending parallel to the longitudinal axis of the cylinder and being arranged for guiding the adjustable sensors along said path.

15. The clamping device of claim 14, further comprising a carrier element for the sensor at the opposite end position, the sensor being fastened to the carrier element and the carrier element being guided in the guide groove, and the carrier element having said protrusion.

16. The clamping device of claim 1, comprising an additional sensor arranged along the positioning path between the two end position detecting sensors, the additional sensor being arranged close to the sensor at the end position close to the mounting head and being adjustably spaced from the latter sensor.

* * * * *